United States Patent
Kwon et al.

(10) Patent No.: US 7,365,817 B2
(45) Date of Patent: Apr. 29, 2008

(54) MULTI-DOMAIN LIQUID CRYSTAL DISPLAY AND METHOD FOR MANUFACTURING THE SAME

(75) Inventors: Do Hee Kwon, Seoul (KR); Jang Jin Yoo, Seoul (KR)

(73) Assignee: LG.Philips LCD Co., Ltd., Seoul (KR)

( * ) Notice: Subject to any disclaimer, the term of this patent is extended or adjusted under 35 U.S.C. 154(b) by 127 days.

(21) Appl. No.: 09/969,881

(22) Filed: Oct. 4, 2001

(65) Prior Publication Data

US 2002/0047971 A1    Apr. 25, 2002

(30) Foreign Application Priority Data

Oct. 4, 2000    (KR)   ............................. 2000-58082

(51) Int. Cl.
*G02F 1/1337*    (2006.01)
(52) U.S. Cl. .................. 349/129; 349/123; 349/143; 257/E21.414; 257/E29.151; 257/E29.291
(58) Field of Classification Search ............... 349/129, 349/128, 136, 127, 123, 138, 141, 143, 165; 49/129
See application file for complete search history.

(56) References Cited

U.S. PATENT DOCUMENTS

| | | | |
|---|---|---|---|
| 4,911,958 A * | 3/1990 | Mochizuki et al. ......... 428/1.25 |
| 5,636,043 A * | 6/1997 | Uemura et al. ............. 349/156 |
| 5,717,474 A * | 2/1998 | Sarma ......................... 349/85 |
| 5,757,455 A * | 5/1998 | Sugiyama et al. .......... 349/129 |
| 5,877,829 A * | 3/1999 | Okamoto et al. ............. 349/74 |
| 5,889,571 A * | 3/1999 | Kim et al. .................. 349/124 |
| 5,953,091 A * | 9/1999 | Jones et al. ................ 349/129 |
| 6,100,953 A * | 8/2000 | Kim et al. .................. 349/129 |
| 6,356,335 B1 * | 3/2002 | Kim et al. .................. 349/156 |
| 6,466,288 B1 * | 10/2002 | Rho ........................... 349/141 |
| 6,476,893 B1 * | 11/2002 | Sasaki et al. ............... 349/119 |

(Continued)

FOREIGN PATENT DOCUMENTS

EP    768560    *   4/1997

(Continued)

OTHER PUBLICATIONS

Gibbons, Wayne M., et al., "Surface-Mediated Alignment Of Nematic Liquid Crystals With Polarized Laser Light," Nature, vol. 351, May 2, 1991, pp. 49-50.

(Continued)

*Primary Examiner*—A. Sefer
(74) *Attorney, Agent, or Firm*—McKenna Long & Aldridge, LLP (57) ABSTRACT

The present invention relates to a multi-domain, specifically 4-domain, liquid crystal display and a method for manufacturing the same. In one aspect, the liquid crystal display includes a pair of opposed substrates and a liquid crystal injected and sealed between the substrates. A first region and a second region on the first substrate have different alignment directions due to a photosensitive alignment film formed on the first substrate. Each pixel on the second substrate exhibits four different liquid crystal alignment directions when an electric field is applied. This occurs because a fringe field is generated by a slit-patterned pixel electrode of the second substrate, and different alignment directions are formed in the first substrate.

3 Claims, 5 Drawing Sheets

U.S. PATENT DOCUMENTS

| | | | |
|---|---|---|---|
| 6,493,050 B1 * | 12/2002 | Lien et al. | 349/106 |
| 6,524,715 B1 * | 2/2003 | Ootake et al. | 428/447 |
| 6,573,964 B1 * | 6/2003 | Takizawa et al. | 349/129 |
| 6,583,835 B1 * | 6/2003 | Yoshida et al. | 349/124 |
| 6,583,837 B1 * | 6/2003 | Fukumoto et al. | 349/129 |
| 6,587,173 B2 * | 7/2003 | Yoo et al. | 349/129 |
| 6,593,988 B1 * | 7/2003 | Liu et al. | 349/129 |
| 6,630,975 B1 * | 10/2003 | Terashita | 349/139 |
| 7,167,224 B1 * | 1/2007 | Takeda et al. | 349/139 |
| 2001/0024244 A1 * | 9/2001 | Son | 349/43 |
| 2002/0080312 A1 * | 6/2002 | Yamaguchi et al. | 349/129 |
| 2004/0075798 A1 * | 4/2004 | Inoue et al. | 349/129 |
| 2005/0225706 A1 * | 10/2005 | Miyachi et al. | 349/117 |

FOREIGN PATENT DOCUMENTS

| | | | |
|---|---|---|---|
| GB | 2 343 012 | * | 4/2000 |
| JP | 61-236525 | * | 10/1986 |
| JP | 6-301036 | * | 10/1994 |
| JP | 07-253578 | | 10/1995 |
| JP | 10-288786 | * | 10/1998 |
| JP | 11-337982 | * | 12/1999 |
| JP | 2001-209052 | * | 3/2001 |
| JP | 2001-174821 | * | 6/2001 |
| JP | 2001-235751 | * | 8/2001 |
| KR | 10-2000-0033165 | | 6/2000 |

OTHER PUBLICATIONS

Shannon, P.J. et al., "Patterned Optical Properties In Photopolymerized Surface-Aligned Liquid Crystal Films," Nature, vol. 368, Apr. 7, 1994, pp. 532-533.

* cited by examiner

MULTI-DOMAIN LIQUID CRYSTAL DISPLAY AND METHOD FOR MANUFACTURING THE SAME

This application claims the benefit of Korean Application No. 58082/2000, filed in Korea on Oct. 4, 2000, which is hereby incorporated by reference.

BACKGROUND OF THE INVENTION

1. Field of the Invention

The present invention relates to a multi-domain liquid crystal display and a method for manufacturing the same. In particular, the present invention relates to a multi-domain liquid crystal display and a method for manufacturing the same, the liquid crystal display including two opposed substrates (a first substrate and a second substrate) and liquid crystal injected and sealed between the two substrates.

2. Discussion of the Related Art

Figure 1:
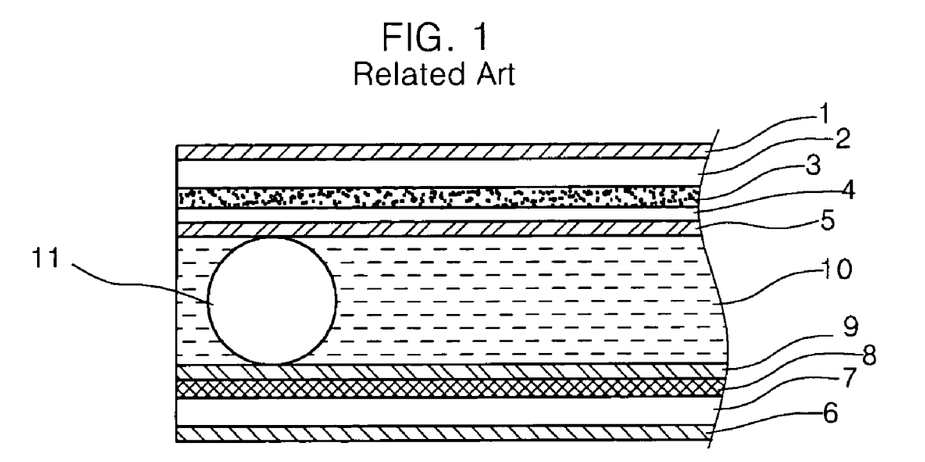
FIG. 1 is a cross-sectional view of a liquid crystal display of the related art.

As shown in FIG. 1, a liquid crystal display is comprised of two opposed substrates (a first substrate and a second substrate), and a liquid crystal is inserted and sealed between the substrates.

The first substrate includes a polarizing plate 1, a transparent substrate 2, a color filter 3, a common electrode 4 and an alignment film 5; and the second substrate includes a polarizing plate 6, a transparent substrate 7, a thin film transistor (hereinafter referred to as TFT) array 8 and an alignment film 9.

The TFT array 8 on the transparent substrate is comprised of a plurality of pixels arrayed in perpendicular and horizontal directions, each pixel having a TFT and a pixel electrode connected to the TFT as a basic unit. The pixels are regions defined by gate bus lines and data bus lines. These bus lines are connected to the corresponding TFTs in the respective pixels.

The color filter 3 is a transparent substrate including one pigment from the group of Red, Green and Blue, and a plurality of color filters are formed in correspondence with each pixel. The common electrode, which generates an electric field relative to the pixel electrode, is formed on the surface of the color filter, and the alignment film is formed on the common electrode.

The liquid crystal 10 is injected between the first substrate and the second substrate, and thereafter the injected liquid crystal is sealed. Also, a spacer 11 is interposed between the two substrates to maintain a constant cell gap.

The liquid crystal display having the construction described above applies a voltage to each pixel on the TFT substrate in order to generate a voltage difference between the pixel electrode corresponding to the pixel and the common electrode on the color filter for rearranging the liquid crystal in that area to display an intended picture image.

The liquid crystal display uses respective color filters corresponding to the three primary colors of light, namely, Red (R), Green (G) and Blue (B). The RBG color filters are positioned close to one another, and a black matrix (BM) (not shown) is formed between color filters situated in adjacent pixels. The black matrix controls the brightness of light when a corresponding signal is applied to the pixel to express the colors.

The TFT liquid crystal display is characterized by a high brightness, a high contrast and low energy consumption, and thus it has been widely applied to desktop computer monitors, notebook computer monitors, TV image receivers, vehicle TV image receivers and navigators, and so forth.

Recently, more advanced liquid crystal displays are in demand in order to keep up with the multimedia era. As an attempt to meet the recent demand, several wide viewing angle (VA) technologies were proposed. However, those technologies have various disadvantages, such as an increase in energy consumption due to a deteriorated aperture ratio, degradation of a front display quality and undesirable effects on the production process.

One of the technologies for securing a wide viewing angle offers an alignment structure of liquid crystal molecules and suggests a multi-domain cell having regions with different structures in a pixel.

For example, an alignment film formed on a substrate undergoes a rubbing treatment or a mechanical treatment to make an alignment treatment in one direction, and a slit pattern is formed in a pixel electrode (or common electrode) on the other substrate to produce the fringe field effect (FFE), thereby providing a pixel with two domains with two different liquid crystal alignment directions. In another case, an alignment film is coated with a photosensitive material, and ultraviolet (UV) is radiated thereon, creating two domains with different alignment directions of the liquid crystal.

Figure 2:
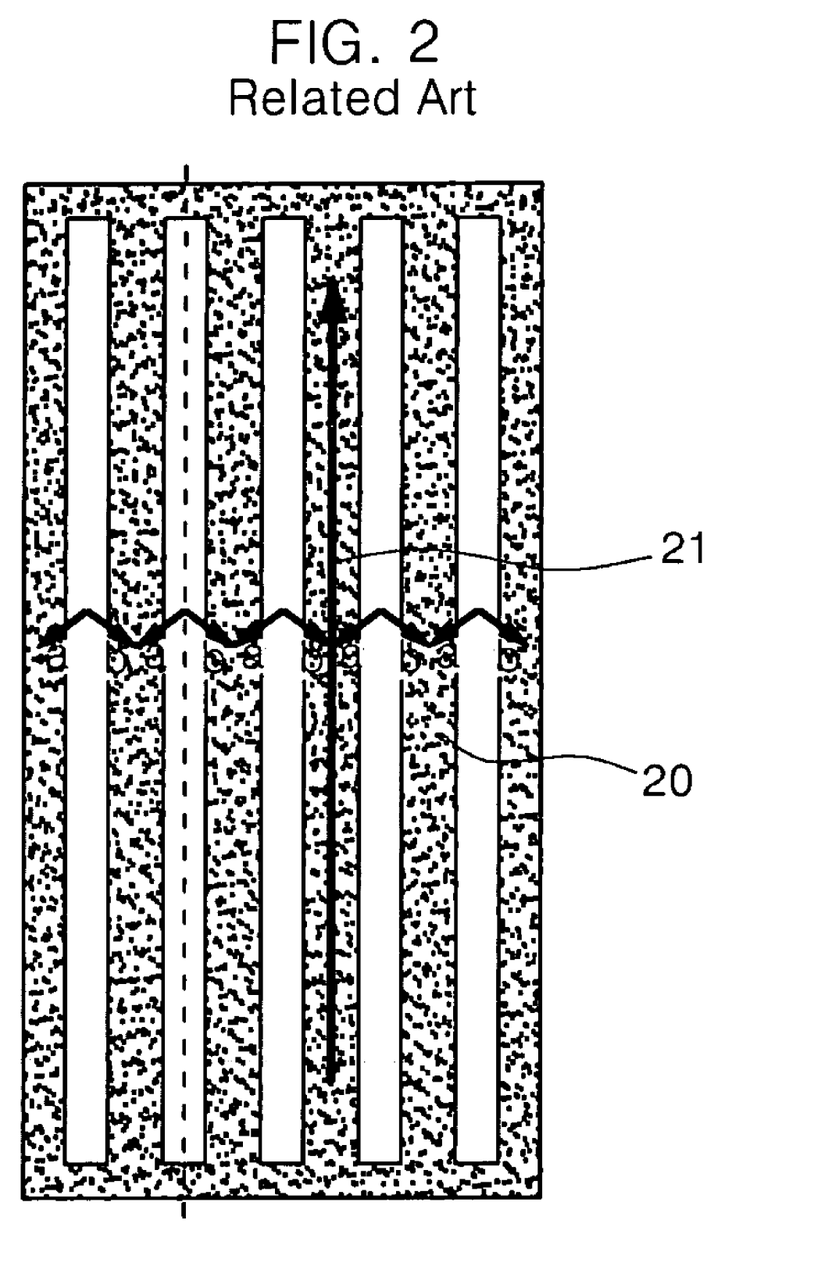
FIG. 2 is a plan view of a liquid crystal display of the related art.

FIG. 2 is a plan view illustrating a liquid crystal display having two domains according to the related art. Here, reference numeral 20 indicates a slit-patterned pixel electrode, reference numeral 21 indicates the alignment direction, and a and b indicate average liquid crystal alignment directions at the respective positions when a maximum voltage is applied.

The 2-domain liquid crystal display shown in FIG. 2 is manufactured as follows. First, the alignment film formed on the first substrate undergoes either a rubbing treatment or mechanical treatment in one direction. The second substrate does not undergo the alignment treatment, and the slit pattern is instead formed on the pixel electrode in order to produce the FFE.

Then, the liquid crystal having a negative dielectric constant is injected and sealed between the first substrate and the second substrate. That is, the rubbing treatment determines a pretilt angle for the first substrate, and each pixel in the second substrate has two domains with two different alignment directions a and b due to the fringe field produced by the slit pattern formed in the pixel electrode.

However, the aforementioned method is limited to the 2-domain liquid display only, and is not appropriate for embodying more than two domains since the rubbing treatment may cause various problems.

For example, dust particles and electrostatic charges can be generated during the rubbing treatment, and this may cause severe damage to the liquid crystal display element. In addition, microgrooves created during rubbing are a main factor resulting in light scattering and chaotic phase distortion.

On the other hand, a photoalignment method of irradiating polarized ultraviolet to photosensitive polymers has been already known. According to this method, the alignment ability of photosensitive material is determined by anisotropic material derived from the irradiation. Examples of usable photoalignment materials include polyvinylcinnamate (PVCN), polysiloxane (PS) and polyimide (PI). The photoalignment characteristics of these materials are manifested upon application of UV irradiation.

It is generally believed that the alignment direction of the surface of the alignment material is always perpendicular to the polarization direction of the UV. However, some material is aligned parallel to the polarization direction of the UV.

Compared to the rubbing method in general, the photo-alignmnent technology has many advantages since it does not generate electrostatic charges and dust particles, which are typically generated in the rubbing method.

Especially, the photoalignment technology is applicable to the manufacture of 2-domain structure in order to improve viewing angles of the liquid crystal display, optical storage devices, and process devices.

As one example, in the method suggested by W. Gibbons et al (Nature 351 (1991) 49), the photoalignment material is rubbed in a single direction, and then the substrate is irradiated by UV radiation through a mask in order to make the alignment direction perpendicular to the initial rubbing direction.

According to this method, the liquid crystal display is comprised of one substrate having two domains, the other substrate having a single domain that is aligned to the initial rubbing direction, and liquid crystal injected between the two substrates. The liquid crystal cell of this liquid crystal display element has a 90° twisted structure in a region corresponding to a transparent portion in the photoalignment process.

Unfortunately, the above method utilizes the rubbing method of polymers, which generates dust and electrostatic charges upon formation of microgrooves on the surface of the alignment film, leaving the aforementioned problems unsolved.

Another study done by P. Shennon et al (Nature 368 (1994) 532) employs an irradiation method by using polarized light for the initial alignment instead of rubbing the surface of the alignment film.

Although this method successfully solved the problems of the rubbing process, it requires several extra processes since-the alignment film must be exposed to polarized light twice with different polarization directions in order to provide different alignment directions in the respective domains, separately.

Therefore, a new technology needs to be developed to efficiently and effectively construct a multi-domain liquid crystal display.

SUMMARY OF THE INVENTION

Accordingly, the present invention is directed to a multi-domain liquid crystal display and method for manufacturing the same that substantially obviate one or more of the problems due to limitations and disadvantages of the related art.

An object of the present invention is to provide a 4-domain liquid crystal display and a method for manufacturing the same, which have superior reliability and characteristics, with a simpler manufacturing scheme.

Additional features and advantages of the invention will be set forth in the description which follows, and in part will be apparent from the description, or may be learned by practice of the invention. The objectives and other advantages of the invention will be realized and attained by the scheme particularly pointed out in the written description and claims hereof as well as the appended drawings.

To achieve these and other advantages and in accordance with the purpose of the present invention, as embodied and broadly described, the liquid crystal display according to a first aspect includes a first substrate having a transparent substrate, a color filter, a common electrode and a first alignment film, which are disposed in that order; a second substrate facing the first substrate and having a transparent substrate, a thin film transistor (TFT) array including a plurality of slit-patterned pixel electrodes, and a second alignment film; a spacer for maintaining a specified space between the first substrate and the second substrate; and liquid crystal injected between the first substrate and the second substrate.

Here, a third alignment film may be formed on a certain part of the first alignment film region. The third alignment film of the first substrate may preferably be made of photopolymerizable liquid crystal including a chiral dopant, for example.

The liquid crystal injected between the first substrate and the second substrate may preferably have a negative dielectric constant, and the first alignment film may preferably be made of a compound selected from the group consisting of PI (polyimide), PVCN (polyvinylcinnamate), PSCN (polysiloxane cinnamate), and CelCN (cellulose cinnamate).

Here, the first alignment film has at least two regions, and the liquid crystal in the respective regions aligns in directions different from each other.

In another aspect, the present invention provides a method for manufacturing the multi-domain liquid crystal of the present invention, including the steps of forming a first alignment film on a first substrate and rubbing the film to define an alignment direction therein; forming a second alignment film including a chiral dopant on a certain part of the first alignment film; forming an alignment film on a second substrate where a plurality of slit-patterned pixel electrodes are formed; and injecting liquid crystal between the first substrate and the second substrate.

The alignment angle of the second alignment film from the first alignment film can be adjusted by controlling the amount of the chiral dopant and/or adjusting the thickness of the second alignment film.

In another aspect, the present invention provides a method for manufacturing the multi-domain liquid crystal display, the method including the steps of forming an alignment film on a first substrate by using a photosensitive material, thereby forming a photoalignment film; forming different alignment directions in different regions by radiating light to the photoalignment film; forming an alignment film on a second substrate where a plurality of slit-patterned pixel electrodes are formed; and injecting liquid crystal between the first substrate and the second substrate.

Here, the first alignment film of the first substrate may preferably be selected from the group consisting of PI (polyimide), PVCN (polyvinylcinnamate), PSCN, and CelCN.

According to one aspect of the 4-domain liquid crystal display of the present invention, a first region and a second region have different alignment directions due to an alignment film and a photosensitive-photopolymerizable liquid crystal layer including a chiral dopant formed on the first substrate. The liquid crystal display has a pixel with four different liquid crystal alignment directions due to a fringe field produced by a slit-patterned pixel electrode for deriving a fringe field effect (FFE). No alignment treatment is provided in an alignment film in the second substrate.

In a further aspect, the present invention provides a multi-domain liquid crystal display, including a first substrate including a first transparent substrate, a color filter, a common electrode and a first alignment film; a second substrate oppositely placed to the first substrate, the second substrate including a second transparent substrate, a plurality of slit-patterned pixel electrodes, a thin film transistor (TFT) array, and a second alignment film; a spacer for maintaining a substantially constant cell gap between the first substrate and the second substrate; and a liquid crystal between the first substrate and the second substrate, wherein the liquid crystal has at least four domains, and liquid crystal molecules in different domains of the liquid crystal align in different directions upon application of a voltage across the liquid crystal.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

First Embodiment

Figure 3A:
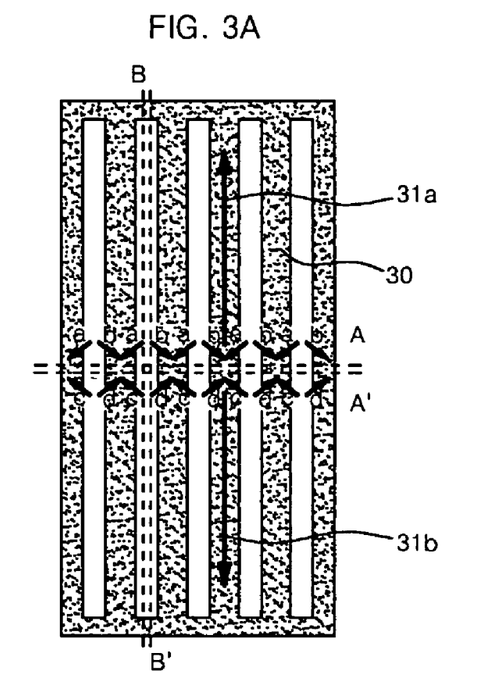
FIG. 3A is a plan view of a multi-domain crystal display according to a first embodiment of the present invention.
Figure 3B:
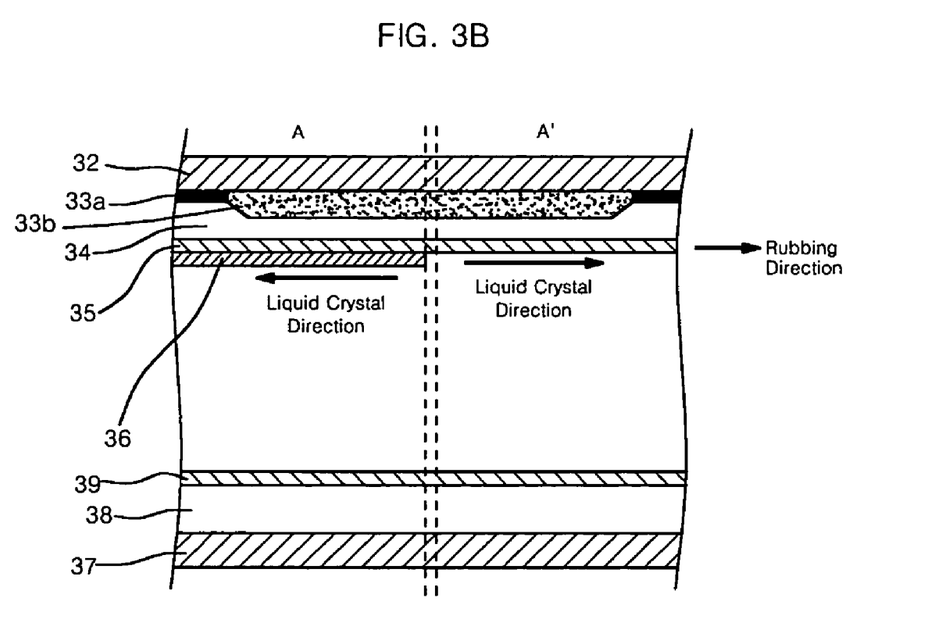
FIG. 3B is a cross-sectional view taken along the line B-B' of FIG. 3A.

FIG. 3A is a plan view of a multi-domain crystal display according to a first embodiment of the present invention. FIG. 3B is a cross-sectional view taken along the line B-B' of FIG. 3A. Reference number 30 indicates a slit-patterned pixel electrode, reference numbers 31a and 31b indicate alignment directions, and a, b, c and d indicate four different alignment directions (4 domains) of liquid crystal in the respective regions when an electric field is applied to the pixel.

In this preferred mode, the first substrate includes a transparent substrate 32, a black matrix 33a, a color filter 33b, a common electrode 34, an alignment film 35, and a photopolymerizable liquid crystal layer 36, which are disposed in that order, for example.

The alignment film 35 is aligned in a single direction through a rubbing process or mechanical treatment. The alignment film 35 is then coated with the photopolymerizable liquid crystal layer 36.

Next, using a mask, the photopolymerizable liquid crystal layer 36 is patterned to partially cover the alignment film 35 (region A). The layer 36 includes a chiral dopant in this example. The liquid crystal layer 36 is aligned to a direction different from the direction of the alignment film 35 due to the chiral dopant. That is, with the chiral dopant added to the photopolymerizable liquid crystal layer 36, the liquid crystal molecules in the layer 36 rotate relative to the direction defined by the alignment film 35. The rotational angle from the direction of the alignment film 35 is determined by the amount of the chiral dopant added and the thickness of the photopolymerizable liquid crystal layer 36.

The second substrate includes a transparent substrate 37, a slit-patterned pixel electrode 38 and an alignment film 39. Here, the alignment film 39 on the pixel electrode 38 does not undergo any alignment treatment, and induces the FFE through the slit-patterned pixel electrode 38.

The slit pattern distorts the electric field. If the area of the slit is enlarged, the liquid crystal molecules are driven more stably. Meanwhile, if there is no slit or the slit is very slim, the degree of distortion of the electric field that is necessary for the domain division becomes very small. Therefore, an appropriate slit size should be provided.

Lastly, a liquid crystal having a negative dielectric constant is injected between the first substrate and the second substrate to complete the multi-domain liquid crystal display of this example.

The liquid crystal display according to the present example has different alignment directions in the first region A and the second region A' on the first substrate. Also, as a result of the fringe field produced by the slit-patterned pixel electrode on the second substrate, the liquid crystal display has four different alignment directions a, b, c, and d within each pixel when an electric field is applied to the pixel. In this way, the four-domain liquid crystal display is constructed.

Compared with the two-domain liquid crystal display in terms of the step inversion (or gray inversion), the four-domain liquid crystal display of this example has a wider viewing angle and improved overall performance.

Second Embodiment

Figure 4A:
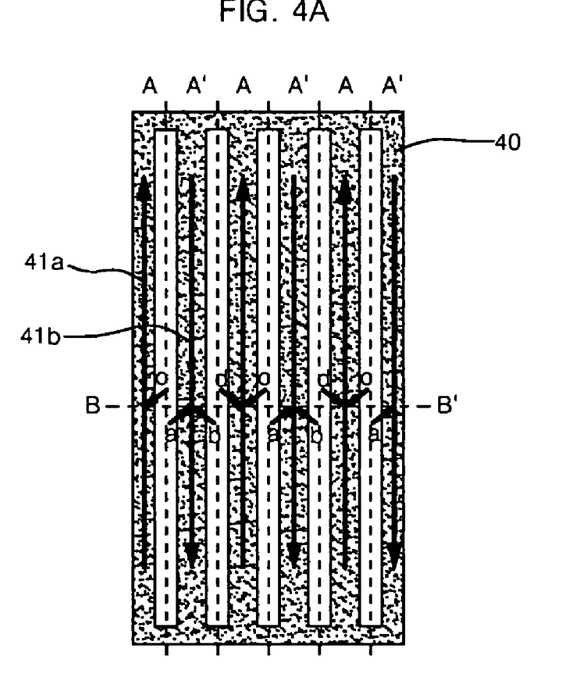
FIG. 4A is a plan view showing a multi-domain crystal display according to a second embodiment of the present invention.
Figure 4B:
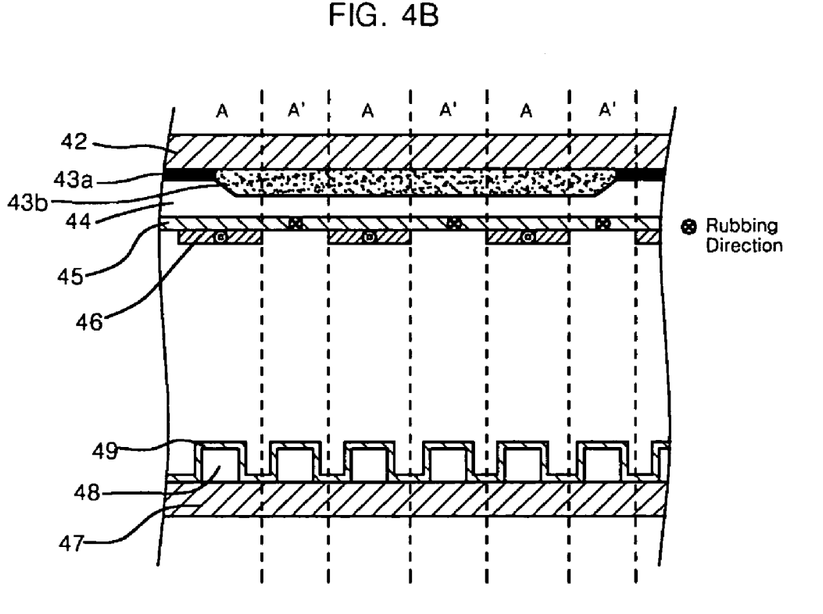
FIG. 4B is a cross-sectional view taken along the line B-B' of FIG. 4A.

FIG. 4A is a plan view of a multi-domain liquid crystal display according to a second embodiment of the present invention. FIG. 4B is a cross-sectional view taken along the line B-B' of FIG. 4A. Reference numeral 40 indicates a slit-patterned pixel electrode, reference numeral 41a and 41b indicate alignment directions, respectively, and a, b, c and d indicate four different alignment directions (4 domains) of the liquid crystal in the respective regions when an electric field is applied to the pixel.

In this example, the first substrate includes a transparent substrate 42, a black matrix 43a, a color filter 43b, a common electrode 44, an alignment film 45, and a photopolymerizable liquid crystal layer 46, which are disposed in that order, for example.

The alignment film 45 is aligned in a single direction through a rubbing process or mechanical treatment. The alignment film 45 is then coated with a photopolymerizable liquid crystal layer 46.

Next, using a mask, the photopolymerizable liquid crystal layer 46 is patterned to partially cover the alignment film 45 (regions A). The layer 46 of this example includes a chiral dopant. Due to the chiral dopant, the liquid crystal layer 46 is aligned in a direction different from that of the alignment film 45.

The rotational angle from the alignment direction of the alignment film 45 is determined by the amount of the chiral dopant added and the thickness of the photopolymerizable liquid crystal layer 46.

In this example, the second substrate includes a transparent substrate 47, a slit-patterned pixel electrode 48, and an alignment film 49. The alignment film 49 on the pixel electrode 48 does not undergo any alignment treatment, and induces the FFE through the slit-patterned pixel electrode 48.

Finally, a liquid crystal having a negative dielectric constant is injected between the first substrate and the second substrate to complete the multi-domain liquid crystal display of this example.

The liquid crystal display according to the instant example has different alignment directions in the first regions A and the second regions A' on the first substrate. Also, due to the fringe field generated by the slit-patterned pixel electrode 48 on the second substrate, the liquid crystal display has four different alignment directions a, b, c, and d within each pixel when an electric field is applied. In this way, the four-domain liquid crystal display is constructed.

Compared with the two-domain liquid crystal display in terms of the step inversion (or gray inversion), the four-domain liquid crystal display of this example has a wider viewing angle and improved overall performance.

Third Embodiment

Figure 5A:
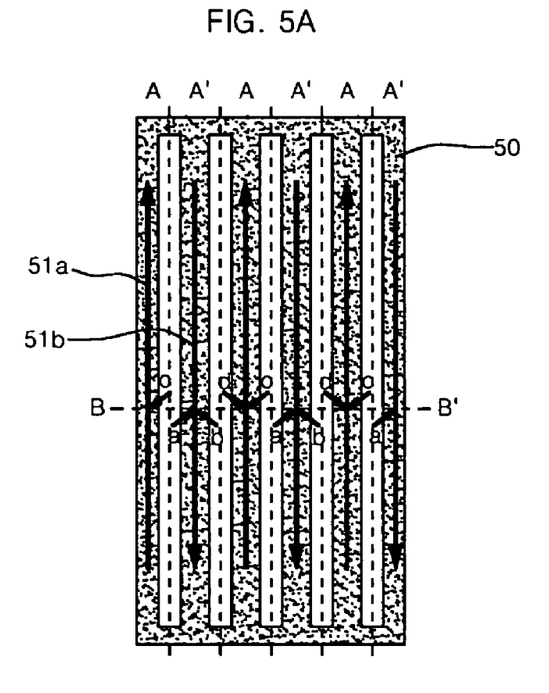
FIG. 5A is a plan view showing a multi-domain crystal display according to a third embodiment of the present invention.
Figure 5B:
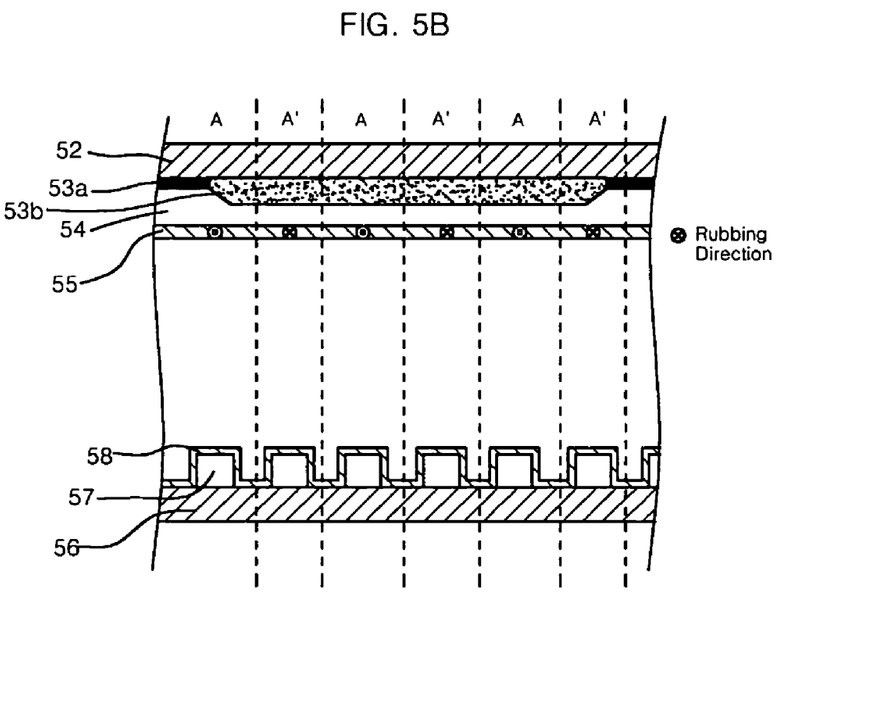
FIG. 5B is a cross-sectional view taken along the line B-B' of FIG. 5A.

FIG. 5A is a plan view of a multi-domain liquid crystal display according to a third embodiment of the present invention. FIG. 5B is a cross-sectional view taken along the line B-B' of FIG. 5A. Reference numeral 50 indicates a slit-patterned pixel electrode, reference numerals 51a and 51b indicate alignment directions, and a, b, c and d indicate four different alignment directions (4 domains) of the liquid crystal in the respective regions when an electric field is applied to the pixel.

In this example, the first substrate includes a black matrix 53a, a color filter 53b, a common electrode 54, and a photosensitive liquid crystal layer (or photoalignment film) 55, which are formed on a transparent substrate 52 in that order, for example. Here, the photoalignment film 55 may preferably be made of a photosensitive material, such as PVCN, PSCN or CelCN, for example.

Then, irradiation is performed twice on the photoalignment film 55 by using a mask to form different alignment directions in the first regions A and the second regions A'. One of the well-known photoalignment treatments is to radiate polarized UV to a photosensitive polymer in order to control the alignment of a liquid crystal layer.

The irradiation method is more advantageous than the rubbing process. In contrast to the rubbing process where the surface of the alignment may become electrostatically charged and dust may be generated, the photosensitive polymer used for the photoalignment material makes it possible to adjust the direction of the alignment axis and the amount of azimuthal anchoring energy without such disadvantages, thereby adjusting the distribution of the liquid crystal directors in the cell more easily and effectively. The photoalignment process in accordance with the present invention enables effective and efficient formation of the multi domains having different alignment directions from one another.

In this example, the second substrate includes a transparent substrate 56, a slit-patterned pixel electrode 57, and an alignment film 58. The alignment film 58 on the pixel electrode 57 does not undergo any alignment treatment, and the FFE is induced through the slit-patterned pixel electrode 57. Any alignment material can be used for the second substrate.

In this example, a liquid crystal having a negative dielectric constant is injected between the first substrate and the second substrate to complete the multi-domain liquid crystal display.

The liquid crystal display according to this example has different alignment directions in the first regions A and the second regions A' on the first substrate. Also, due to the fringe field generated through the slit-patterned pixel electrode 57 on the second substrate, the liquid crystal has four different alignment directions a, b, c, and d within each pixel when an electric field is applied. In this way, the four-domain liquid crystal display of the present example is constructed.

Compared with the two-domain liquid crystal display in terms of the step inversion (or gray inversion), the four-domain liquid crystal display of this example has a wider viewing angle and improved overall performance.

Thus, the present invention provides a method for efficiently and effectively embodying a multi-domain vertical alignment mode liquid crystal display that utilizes the FFE (Fringe Field Effect). In addition, the present invention provides a multi-domain liquid crystal display that has a wider viewing angle and a high yield.

It will be apparent to those skilled in the art that various modifications and variations can be made in the multi-domain liquid crystal display and method for manufacturing the same of the present invention without departing from the spirit or scope of the invention. Thus, it is intended that the present invention cover the modifications and variations of this invention provided they come within the scope of the appended claims and their equivalents.

What is claimed is:

1. A multi-domain liquid crystal display, comprising:
a first substrate including a first transparent substrate, a color filter, a common electrode and a first alignment film, the first alignment film having first regions of a first aligning direction and second regions of a second aligning direction alternating with the first regions in one layer;
a second substrate oppositely placed to the first substrate, the second substrate including a second transparent substrate, a plurality of slit-patterned pixel electrodes, a thin film transistor (TFT) array, and a second alignment film covering the slit-patterned pixel electrodes, the second alignment film having no predetermined aligning direction therein;
a fringe field that is induced by each of the slit patterned pixel electrodes and the second film having no predetermined aligning direction;
a spacer for maintaining a substantially constant cell gap between the first substrate and the second substrate; and
a liquid crystal between the first substrate and the second substrate,
wherein the liquid crystal has at least four domains, and liquid crystal molecules in different domains of the liquid crystal align in different directions upon application of a voltage across the liquid crystal.

2. The liquid crystal display according to claim 1, wherein the liquid crystal between the first substrate and the second substrate has a negative dielectric constant.

3. The liquid crystal display according to claim 1, wherein the first alignment film is made of a compound selected from the group consisting of polyimide (PI), polyvinylcinnamate (PVCN), polysiloxane cinnamate (PSCN), and cellulose cinnamate (CelCN).

* * * * *